(12) United States Patent
Kenny

(10) Patent No.: US 10,863,845 B2
(45) Date of Patent: *Dec. 15, 2020

(54) ARTIFICIAL TREE POLE COVER

(71) Applicant: Ryan Kenny, Dacula, GA (US)

(72) Inventor: Ryan Kenny, Dacula, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,744

(22) Filed: May 15, 2019

(65) Prior Publication Data

US 2019/0261803 A1    Aug. 29, 2019

Related U.S. Application Data

(63) Continuation-in-part of application No. 15/425,122, filed on Feb. 6, 2017, now Pat. No. 10,299,618.

(60) Provisional application No. 62/780,279, filed on Dec. 16, 2018, provisional application No. 62/395,376, filed on Sep. 16, 2016.

(51) Int. Cl.
*A47G 33/06* (2006.01)
*B32B 25/10* (2006.01)
*A47G 33/04* (2006.01)
*B32B 5/02* (2006.01)

(52) U.S. Cl.
CPC .............. *A47G 33/06* (2013.01); *A47G 33/04* (2013.01); *B32B 5/026* (2013.01); *B32B 25/10* (2013.01)

(58) Field of Classification Search
CPC .......... Y10T 428/24008; Y10T 428/14; Y10T 428/1486; A47G 33/06
See application file for complete search history.

(56) References Cited

U.S. PATENT DOCUMENTS

2001/0013212 A1 * 8/2001 Jimenez Sanchez .. A41G 1/001
52/426

* cited by examiner

*Primary Examiner* — Alexander S Thomas
(74) *Attorney, Agent, or Firm* — Bryan W. Bockhop; Bockhop Intellectual Property Law, LLC

(57) ABSTRACT

An artificial tree includes an artificial tree pole having a bottom portion and supporting a plurality of artificial branches extending outwardly therefrom. An artificial tree trunk includes a flexible substrate that is wrapped around the bottom portion of the pole below the plurality of artificial branches. The flexible substrate has a first surface and an opposite second surface, a first edge and an opposite second edge, and a first end and an opposite second end. An image of tree bark is displayed on the first surface.

4 Claims, 6 Drawing Sheets

ARTIFICIAL TREE POLE COVER

CROSS-REFERENCE TO RELATED APPLICATION(S)

This application claims the benefit of U.S. Provisional Patent Application Ser. No. 62/395,376, filed Sep. 5, 2016, and 62/780,279, filed Dec. 6, 2018 the entirety of each of which is hereby incorporated herein by reference.

This application is a continuation-in-part of, and claims the benefit of, U.S. patent application Ser. No. 15/425,122, filed Feb. 6, 2017, now issued as U.S. Pat. No. 10,299,618, the entirety of which is hereby incorporated herein by reference.

BACKGROUND OF THE INVENTION

1. Field of the Invention

The present invention relates to a cover for a pole and, more specifically, a cover for a pole used with an artificial tree.

2. Description of the Related Art

Each year many people make the switch from a real holiday trees (e.g., Christmas trees) to artificial trees. Typical artificial trees employ a metal pole that engages with a stand, from which extend artificial branches. The artificial branches typically include a twisted wire that hold plastic bristles (usually colored forest green) having the appearance of pine needles. Although many of these artificial trees look realistic, the portion of the pole at the bottom of the tree where it connects to the stand is usually viewable by the observer, giving the tree a feel of artificiality.

Consumers spend hundreds of dollars each year to get elaborate artificial trees that look as real as possible. However, such trees still look artificial because of the metal pole that supports them.

Therefore, there is a need for a pole cover for an artificial tree that creates an illusion of tree bark.

SUMMARY OF THE INVENTION

The disadvantages of the prior art are overcome by the present invention which, in one aspect, is a cover for an artificial tree pole that includes a flexible substrate that has: a first surface and an opposite second surface, a first edge and an opposite second edge, and a first end and an opposite second end. A first decorative image is displayed on at least the first surface. A first coupling member is disposed on the first surface adjacent to the first edge. A second coupling member is disposed on the second surface adjacent to the second edge. The second coupling member is complimentary to the first coupling member and is engagable with the first coupling member so that when the flexible substrate is wrapped around the artificial tree pole, the first coupling member will be secured to the second coupling member. As a result, a portion of the artificial tree pole will be hidden behind the first decorative image.

In another aspect, the invention is an artificial tree pole cover that includes a flexible substrate having a first surface and an opposite second surface, a first edge and an opposite second edge, and a first end and an opposite second end. A first decorative image is displayed on at least the first surface. The flexible substrate includes a synthetic rubber sheet with a knit fabric laminated to at least the first surface. A first coupling member that includes first type of hook-and-loop fastener is disposed on the first surface adjacent to the first edge. A second coupling member that includes a second type of hook-and-loop fastener is disposed on the second surface adjacent to the second edge. The second type of hook-and-loop fastener is complimentary to the first type of hook-and-loop fastener and is engagable therewith. When the flexible substrate is wrapped around the artificial tree pole, the first type of hook-and-loop fastener will be secured to the second type of hook-and-loop fastener so that a portion of the artificial tree pole will be hidden behind the first decorative image.

In another aspect, the invention is a pole cover for covering a portion of a pole used with an artificial tree that includes a flexible substrate having a first surface and an opposite second surface, a first edge and an opposite second edge, and a first end and an opposite second end. A first decorative image that has an appearance of tree bark is printed on at least the first surface so as to cause an illusion that the portion of the pole is a tree trunk. A first coupling member that includes first type of hook-and-loop fastener is disposed on the first surface adjacent to the first edge. A second coupling member that includes a second type of hook-and-loop fastener is disposed on the second surface adjacent to the second edge. The second type of hook-and-loop fastener is complimentary to the first type of hook-and-loop fastener and is engagable therewith so that when the flexible substrate is wrapped around the artificial tree pole, the first type of hook-and-loop fastener will be secured to the second type of hook-and-loop fastener and so that a portion of the artificial tree pole will be hidden behind the first decorative image. A third coupling member that includes the first type of hook-and-loop fastener is disposed on the second surface adjacent to the second edge and to the first end. The third coupling member has physical characteristics corresponding to the first coupling member so that when the flexible substrate is folded inwardly, the third coupling member engages the second coupling member, thereby adjusting a height of the cover so as to accommodate a portion of the pole that is shorter than the flexible substrate.

In another aspect, the invention is an artificial tree that includes an artificial tree pole having a bottom portion and supporting a plurality of artificial branches extending outwardly therefrom. An artificial tree trunk includes a flexible substrate that is wrapped around the bottom portion of the pole below the plurality of artificial branches. The flexible substrate has a first surface and an opposite second surface, a first edge and an opposite second edge, and a first end and an opposite second end. An image of tree bark is displayed on the first surface.

In another aspect, the invention is an artificial tree, in which the flexible substrate includes a cylindrical sheet having an open position in which the first edge is separated from the second edge by a distance sufficient to allow the flexible substrate to pass around the pole and a closed position in which the first edge is disposed adjacent to the second edge.

In yet another aspect, the invention is an artificial tree, in which the flexible substrate comprising a selected one of a felt and a paper. A pressure sensitive adhesive strip is applied to the second surface adjacent to the first edge. A release liner strip is disposed on the pressure sensitive adhesive strip and is configured to be peeled away so as to allow the pressure sensitive adhesive to be secured to the flexible substrate adjacent to the second edge so as to secure the artificial tree trunk around the artificial tree pole.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
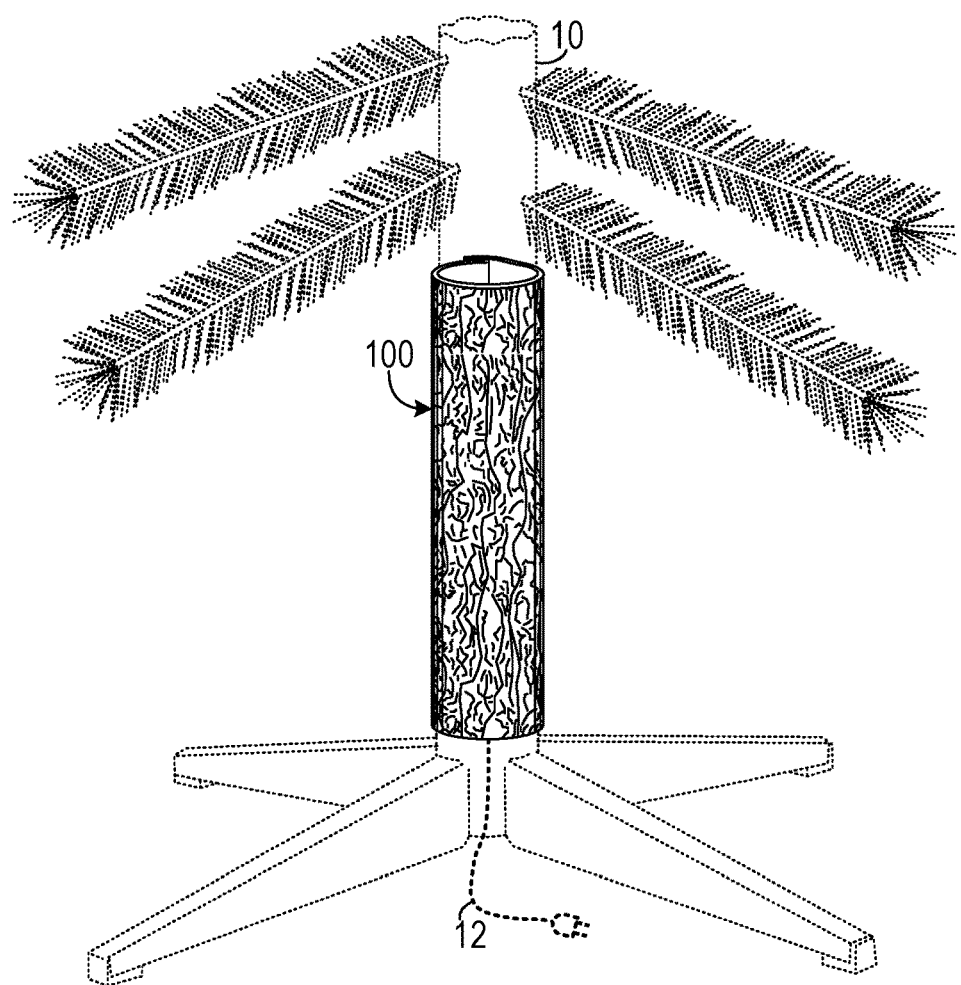
FIG. 1 is a perspective view of one embodiment of a pole cover, as applied to an artificial tree.
Figure 2:
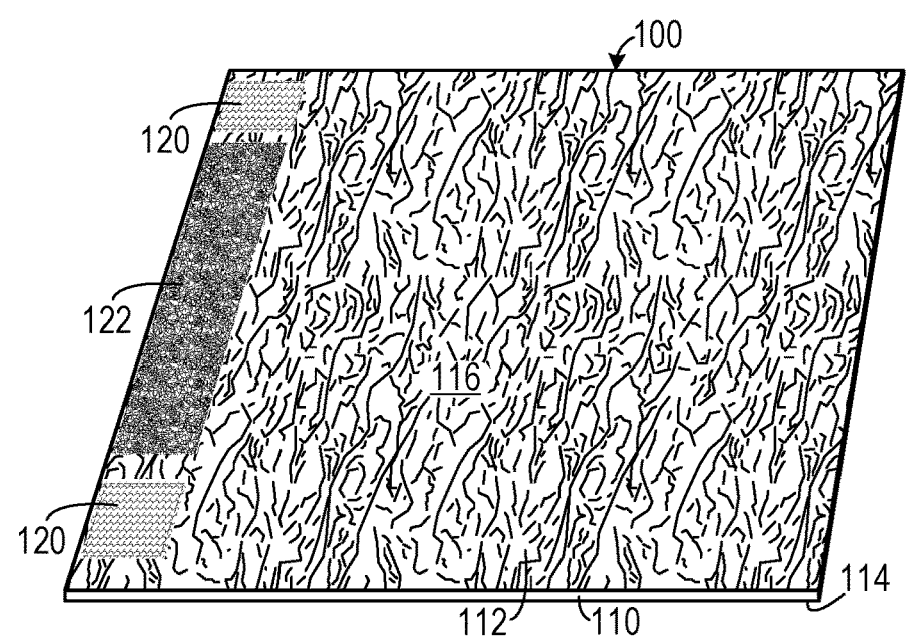
FIG. 2 is a perspective view of one embodiment of a pole cover in a flat state.
Figure 3A:
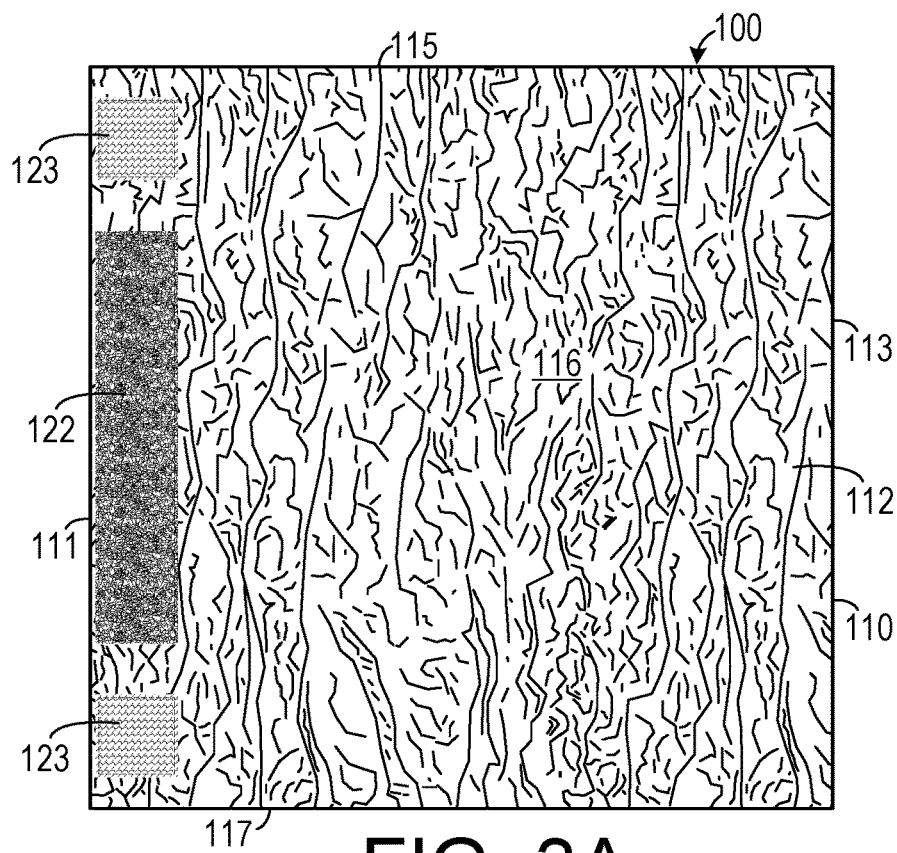
FIG. 3A is a top plan view of a pole cover.
Figure 3B:
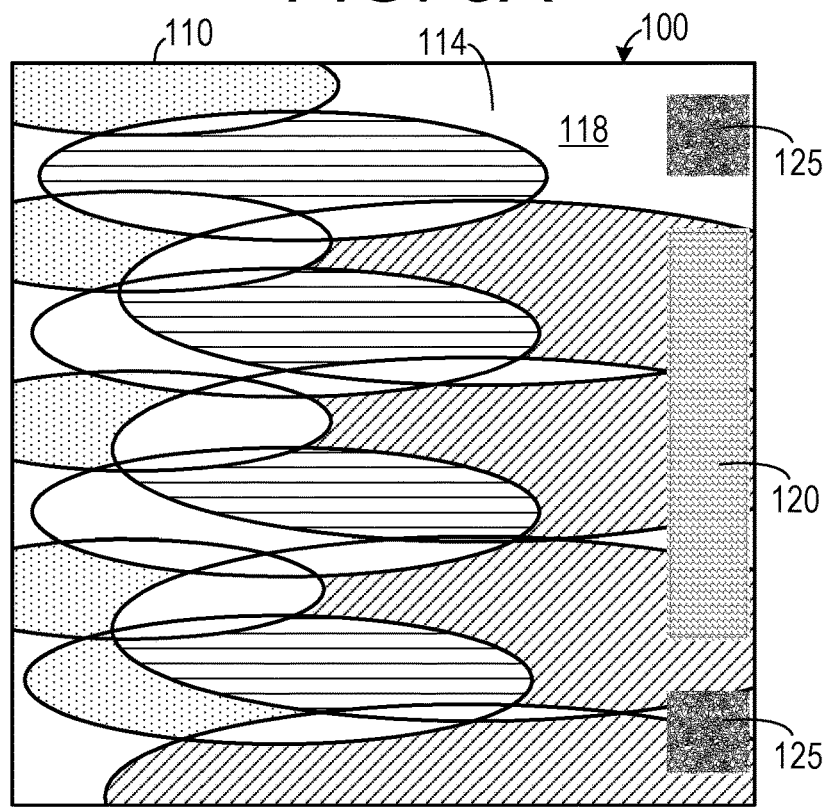
FIG. 3B is a bottom plan view of a pole cover.
Figure 3C:
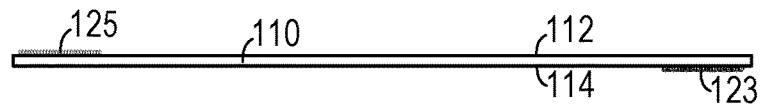
FIG. 3C is a front side elevational view of the pole cover shown in FIG. 3A.
Figure 3D:
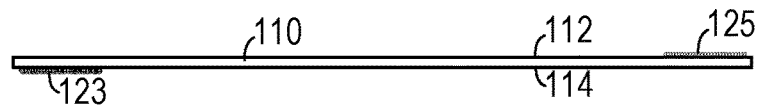
FIG. 3D is a back side elevational view of the pole cover shown in FIG. 3A.
Figure 3E:
FIG. 3E is a left side elevational view of the pole cover shown in FIG. 3A.
Figure 3F:
FIG. 3F is a right side elevational view of the pole cover shown in FIG. 3A.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, "tree bark" means the outer rhytidomal tissue of a tree.

As shown in FIG. 1, one embodiment of a pole cover 100 can be wrapped about a portion of an artificial tree pole 10. The pole cover 100 has the appearance of tree bark (or it can have another decorative design) that creates the illusion to a viewer that the viewer is looking at a natural tree trunk rather than an artificial pole. The pole cover 100 can also be used to hide a power cord 12 of a string of decorative lights.

As shown in FIGS. 2 and 3A-3F, the pole cover 100 includes a flexible substrate 110 having a first surface 112 and an opposite second surface 118, a first edge 111 and an opposite second edge 113, and a first end 115 and an opposite second end 117. The flexible substrate 110 could be made of, for example, a synthetic rubber (e.g., a polychloroprene synthetic rubber sponge material such as Neoprene) with a stretchable knit fabric laminated onto one or both sides. A decorative image 116, such as an image of tree bark, is displayed on at least the first surface 112. In certain embodiments, the flexible substrate can include sheet plastic, paper, felt, or one of the many flexible materials onto which a decorative image can be applied.

The image 116 can be printed on the first surface 112. In certain embodiments, it could also be molded onto the first surface 112 to provide a texture. In some embodiments, a second decorative image 118 can be displayed on the second surface 114, thereby giving a user the option of choosing to display a different image. Such alternate images can include, for example, patterns, colors, or designs that have a festive feel. For example, a candy cane pattern could be used to generate a festive look.

A first coupling member 122 (e.g., a loop-type material of a hook-and-loop fastener) is disposed on the first surface 112 adjacent to the first edge 111. A second coupling member 120 (e.g., a hook-type material of a hook-and-loop fastener) is disposed on the second surface 114 adjacent to the second edge 113. The second coupling member 120 is complimentary to the first coupling member 122 and is engagable therewith. In certain embodiments, the coupling members can include clasps, snaps, magnets, adhesives or one of the may devices that are capable of holding the ends together.

Figure 4A:
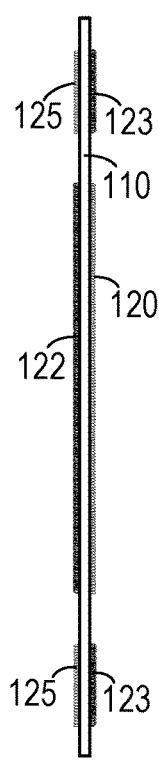
FIG. 4A is a side elevational view of a pole cover in a fully extended state.
Figure 4B:
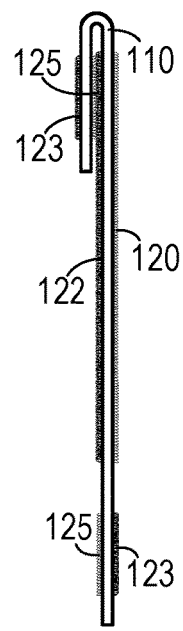
FIG. 4B is a side elevational view of a pole cover in a first shortened state.
Figure 4C:
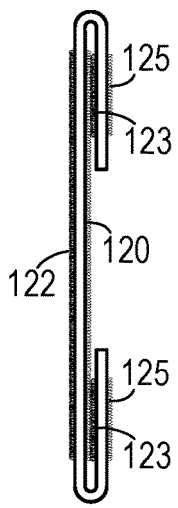
FIG. 4C is a side elevational view of a pole cover in a second shortened state.
Figure 5:
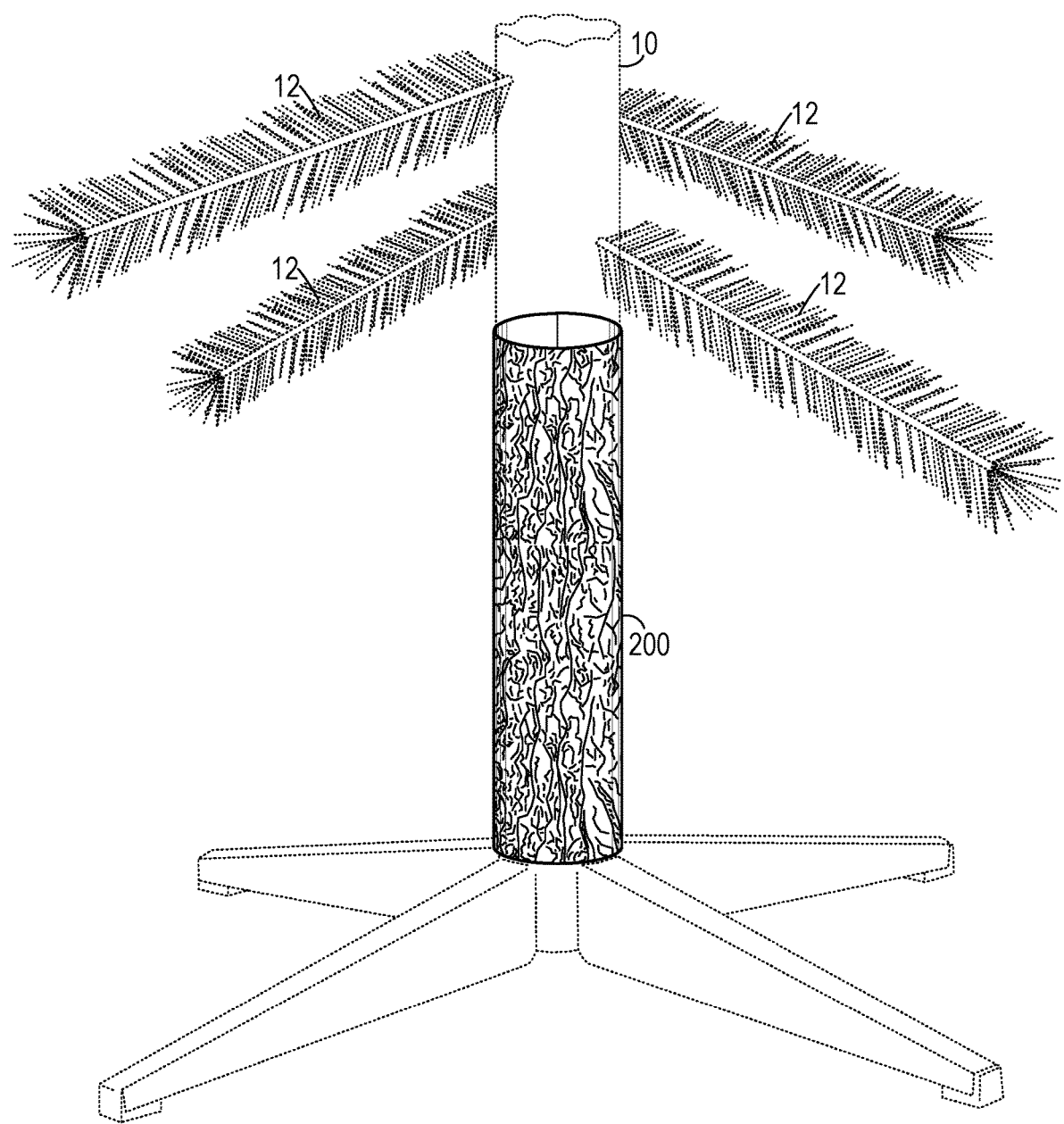
FIG. 5 is a perspective view of the embodiment shown in FIG. 5A, as applied to an artificial tree.
Figure 6A:
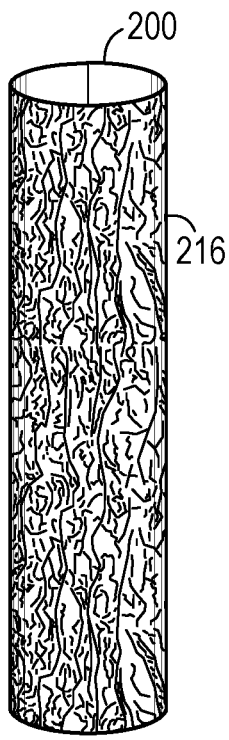
FIG. 6A is a perspective view of a second embodiment of a pole cover.
Figure 6B:
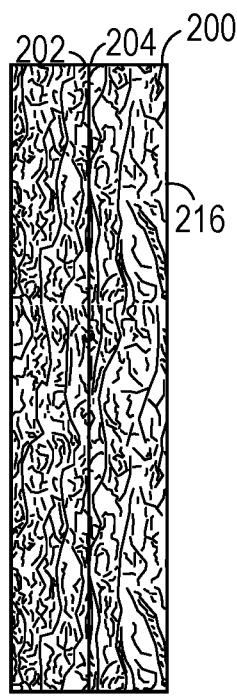
FIG. 6B is an elevational view of the embodiment shown in FIG. 5A.
Figure 6C:
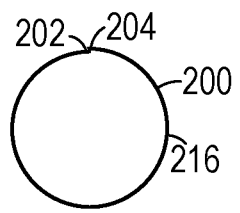
FIG. 6C is a top view of the embodiment shown in FIG. 5A.
Figure 7A:
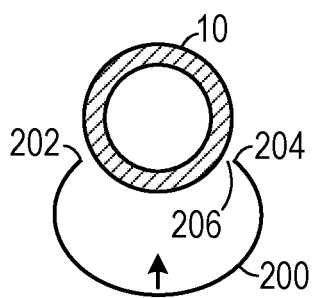
FIGS. 7A-7C are a series of top views showing the embodiment shown in FIG. 5A being applied to a pole.
Figure 7B:
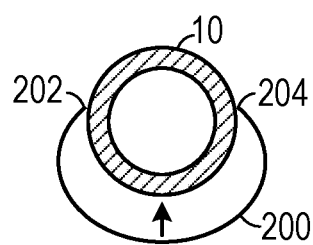
Figure 7C:
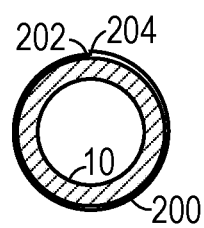

As shown in FIGS. 4A-4C, a third coupling member 125 that has physical characteristics corresponding to the first coupling member 122 can be added so that when the flexible substrate 110 is folded inwardly, the third coupling member 125 engages the second coupling member 120. As a result, the cover 100 will be held in a folded configuration, thereby allowing adjustment of the height of the cover 100 to accommodate shorter poles. A fourth coupling member 125 can be added to allow folding when the side with the second image 118 is displayed.

One embodiment makes the bottom area of artificial Christmas trees look like real tree bark. By wrapping the flexible and adjustable cover 100 around the base pole and acting as faux tree bark, the cover makes an artificial Christmas tree look more realistic and attractive. It installs quickly and gives the tree a more authentic real tree look.

As shown in FIGS. 5, 6A-6C and 7A-7C, one embodiment includes an artificial tree trunk that includes a flexible substrate 200 wrapped around the bottom portion of the pole 10 below the plurality of artificial branches 12. The flexible substrate 200 includes cylindrical sheet 216 having a first edge 202 and an opposite second edge 204. The cylindrical sheet 216 has an open position (shown in FIG. 7A) in which the first edge 202 is separated from the second edge 204 by a distance 206 sufficient to allow the flexible substrate 200 to pass around the pole 10 and a closed position (shown in FIG. 7C) in which the first edge 202 is disposed adjacent to the second edge 204 and in which the natural elasticity of the flexible substrate 200 holds the cylindrical sheet 216 around the pole 10.

In one embodiment, the flexible substrate 200 includes an elastic thermoplastic, such as nylon. In this embodiment, an image (such as an image of tree bark) can be printed onto one side of a thermoplastic sheet and then the thermoplastic is heated until it reaches a plastic (formable) state. It is then wrapped about a cylindrical object having a diameter corresponding to the pole 10 and allowed to cool while still wrapped about the cylindrical object. As a result, it will retain a cylindrical shape. In certain embodiments, the image can be printed using a 3D printer to give it an actual raised texture corresponding, for example, to tree bark.

Figure 8A:
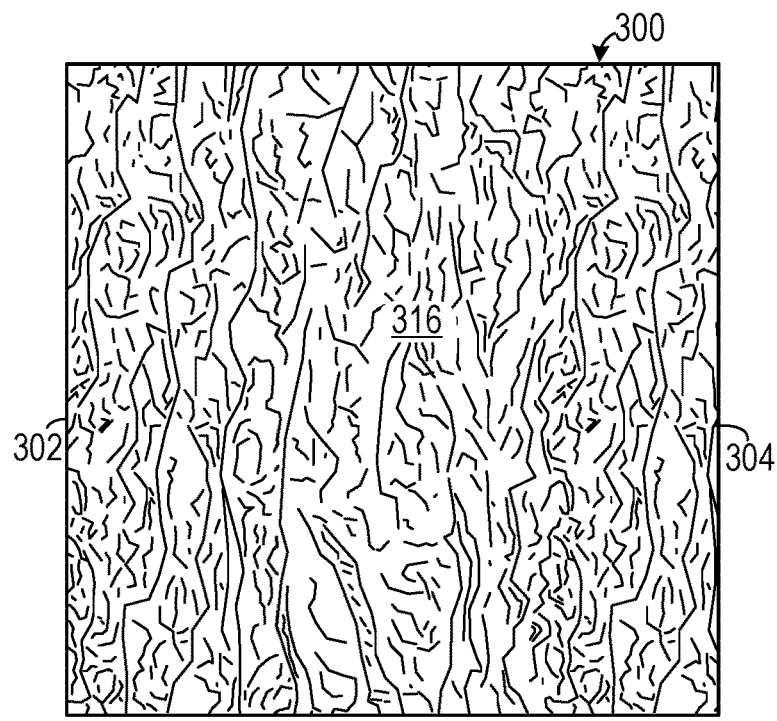
FIG. 8A is a top plan view of third embodiment of a pole cover.
Figure 8B:
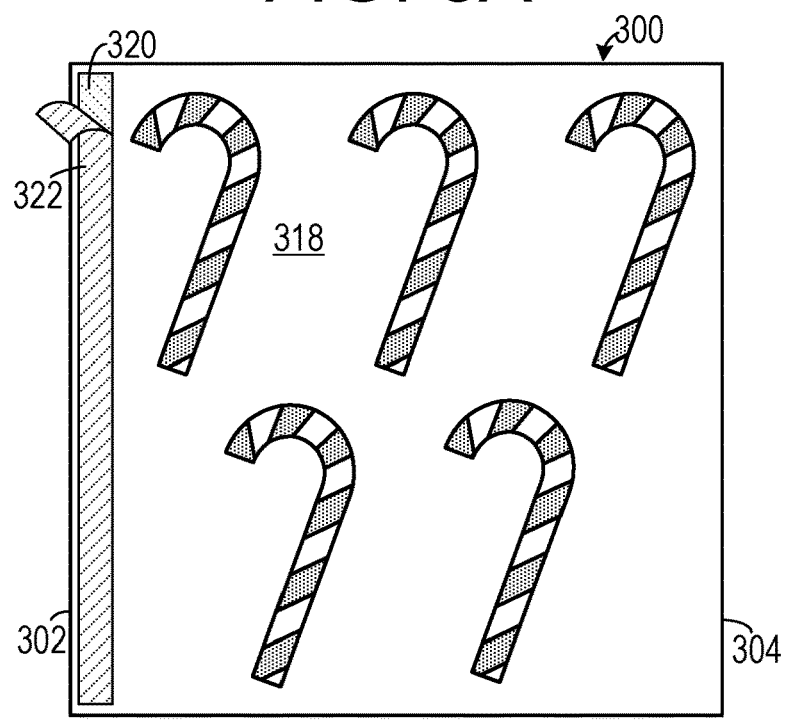
FIG. 8B is a bottom plan view of the embodiment shown in FIG. 8A.
Figure 8C:
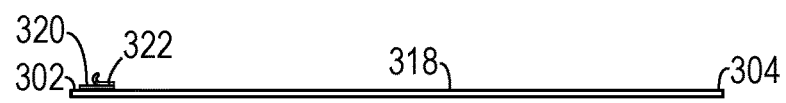
FIG. 8C is a side elevational view of the embodiment shown in FIG. 8A.

In another embodiment, as shown in FIGS. 8A-8C, the flexible substrate 300 includes a first edge 302 and an opposite second edge 304. An image of tree bark is displayed on the first surface 316 and an alternate image can be displayed on the second surface 318. The flexible substrate 300 in this embodiment can include a sheet material, such as a felt, a fabric, a paper, a plasticized paper, a plastic or any one of the many combinations thereof. A pressure sensitive adhesive strip 320 may be applied to the second surface 318 adjacent to the first edge 302 and a release liner strip 322 can be placed on the pressure sensitive adhesive strip 320 to protect it prior to use. When used, the release liner strip 322 is peeled away so as to allow the pressure sensitive adhesive 320 to be secured to the flexible substrate 300 adjacent to the second edge 304 so as to secure the artificial tree trunk around the artificial tree pole 10.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An artificial tree, comprising:
   (a) an artificial tree pole having a bottom portion and supporting a plurality of artificial branches extending outwardly therefrom; and
   (b) an artificial tree trunk that includes a flexible substrate wrapped around the bottom portion of the pole below the plurality of artificial branches, the flexible substrate having a first surface and an opposite second surface, a first edge and an opposite second edge, and a first end and an opposite second end, an image of tree bark being displayed on the first surface,
   wherein the flexible substrate comprises a selected one of a felt and a paper.

2. The artificial tree of claim 1, wherein the flexible substrate comprises a cylindrical sheet having an open position in which the first edge is separated from the second edge by a distance sufficient to allow the flexible substrate to pass around the pole and a closed position in which the first edge is disposed adjacent to the second edge.

3. The artificial tree of claim 1, further comprising:
   (a) a pressure sensitive adhesive strip applied to the second surface adjacent to the first edge; and
   (b) a release liner strip disposed on the pressure sensitive adhesive strip and configured to be peeled away so as to allow the pressure sensitive adhesive to be secured to the flexible substrate adjacent to the second edge so as to secure the artificial tree trunk around the artificial tree pole.

4. An artificial tree, comprising:
   (a) an artificial tree pole having a bottom portion and supporting a plurality of artificial branches extending outwardly therefrom; and
   (b) an artificial tree trunk that includes a flexible substrate wrapped around the bottom portion of the pole below the plurality of artificial branches, the flexible substrate having a first surface and an opposite second surface, a first edge and an opposite second edge, and a first end and an opposite second end, an image of tree bark being displayed on the first surface, the flexible substrate comprising a selected one of a felt and a paper;
   (c) a pressure sensitive adhesive strip applied to the second surface adjacent to the first edge; and
   (d) a release liner strip disposed on the pressure sensitive adhesive strip and configured to be peeled away so as to allow the pressure sensitive adhesive to be secured to the flexible substrate adjacent to the second edge so as to secure the artificial tree trunk around the artificial tree pole.

* * * * *